US012639135B2

(12) United States Patent
Greathouse et al.

(10) Patent No.: US 12,639,135 B2
(45) Date of Patent: May 26, 2026

(54) SYSTEMS AND METHODS FOR CHIPLET SYNCHRONIZATION

(71) Applicants:Advanced Micro Devices, Inc., Santa Clara, CA (US); ATI Technologies ULC, Markham (CA)

(72) Inventors: Joseph L. Greathouse, Austin, TX (US); Alan D. Smith, Austin, TX (US); Anthony Asaro, Markham (CA); Kostantinos Danny Christidis, Markham (CA); Alexander Fuad Ashkar, Orlando, FL (US); Milind N. Nemlekar, San Diego, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 678 days.

(21) Appl. No.: 18/082,882

(22) Filed: Dec. 16, 2022

(65) Prior Publication Data

US 2024/0202047 A1 Jun. 20, 2024

(51) Int. Cl.
*G06F 9/46* (2006.01)
*G06F 9/52* (2006.01)

(52) U.S. Cl.
CPC .................................... *G06F 9/522* (2013.01)

(58) Field of Classification Search
CPC ...................................................... G06F 9/522
See application file for complete search history.

(56) References Cited

U.S. PATENT DOCUMENTS

| | | | |
|---|---|---|---|
| 12,081,216 B1* | 9/2024 | Kandele | H03K 19/17768 |
| 2010/0123694 A1 | 5/2010 | Cok et al. | |
| 2012/0304020 A1 | 11/2012 | Chiu et al. | |
| 2014/0149994 A1* | 5/2014 | Ihara | G06F 9/522 |
| | | | 718/108 |
| 2015/0339173 A1 | 11/2015 | Champseix et al. | |
| 2017/0324440 A1* | 11/2017 | Snow | H04B 1/66 |
| 2019/0056941 A1* | 2/2019 | Wang | G06F 9/30079 |
| 2021/0158599 A1 | 5/2021 | Saleh et al. | |

FOREIGN PATENT DOCUMENTS

EP 3869337 A1 8/2021

OTHER PUBLICATIONS

International Search Report and Written Opinion dated Apr. 1, 2024, from corresponding International Application No. PCT/US2023/084300 (9 pages).

* cited by examiner

*Primary Examiner* — Tammy E Lee
(74) *Attorney, Agent, or Firm* — Greenberg Traurig, LLP

(57) ABSTRACT

The disclosed computer-implemented method can include reaching, by a chiplet involved in carrying out an operation for a process, a synchronization barrier. The method can additionally include receiving, by the chiplet, dedicated control messages pushed to the chiplet by other chiplets involved in carrying out the operation for the process, wherein the dedicated control messages are pushed over a control network by the other chiplets. The method can also include advancing, by the chiplet, the synchronization barrier in response to receipt of the dedicated control messages. Various other methods, systems, and computer-readable media are also disclosed.

15 Claims, 5 Drawing Sheets

200

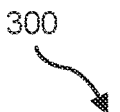

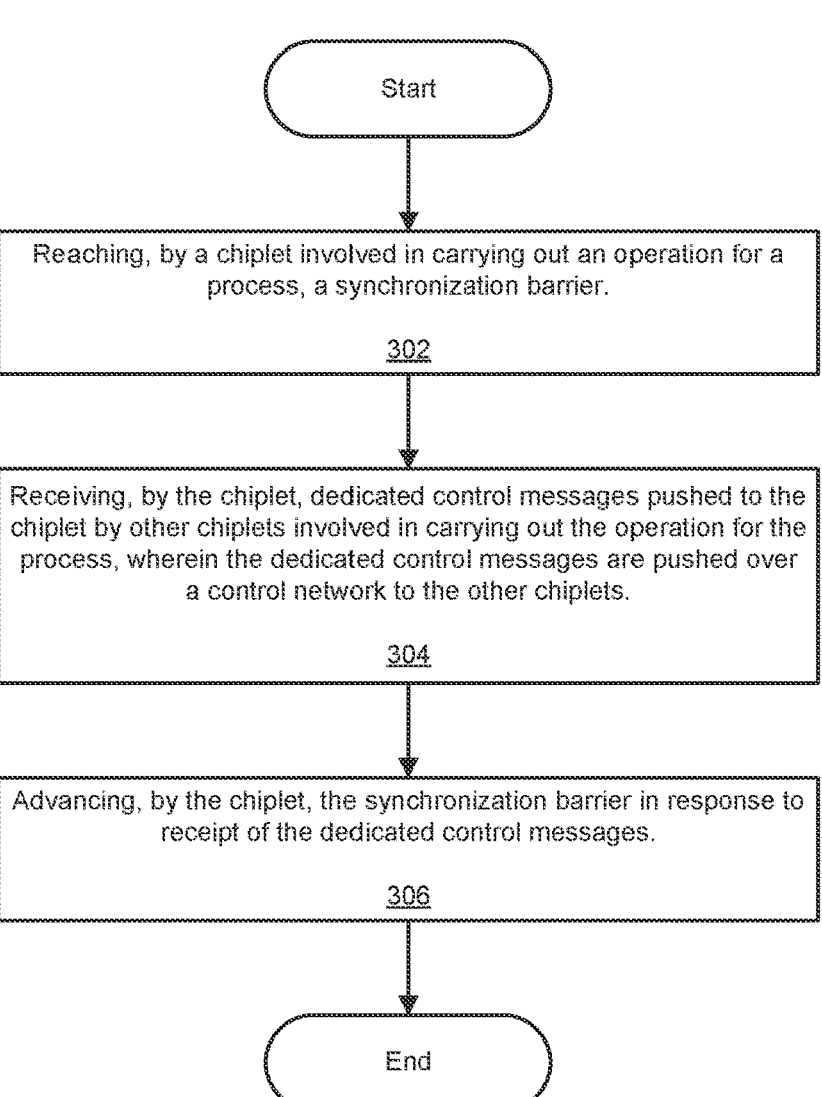

300

Start

Reaching, by a chiplet involved in carrying out an operation for a
process, a synchronization barrier.

302

Receiving, by the chiplet, dedicated control messages pushed to the
chiplet by other chiplets involved in carrying out the operation for the
process, wherein the dedicated control messages are pushed over
a control network to the other chiplets.

304

Advancing, by the chiplet, the synchronization barrier in response to
receipt of the dedicated control messages.

306

End

*FIG. 3*

SYSTEMS AND METHODS FOR CHIPLET SYNCHRONIZATION

BACKGROUND

A chiplet is a tiny integrated circuit (IC) that contains a well-defined subset of functionality. It is designed to be combined with other chiplets on an interposer in a single package. A set of chiplets can be implemented in a mix-and-match assembly, providing several advantages over a traditional system on chip (SoC).

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 3 is a flow diagram of an example method for chiplet synchronization.

Figure 1:
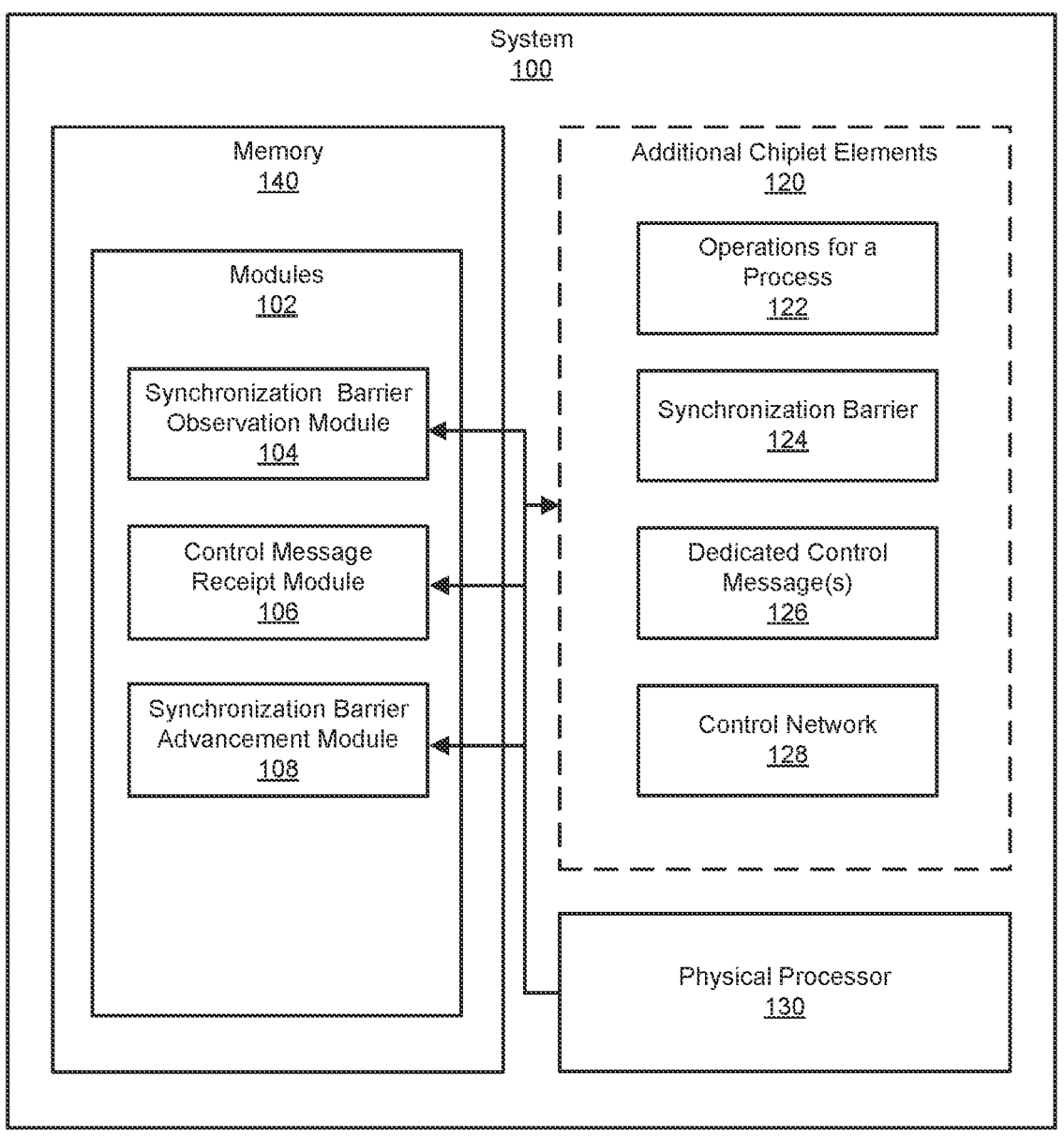
FIG. 1 is a block diagram of an example system for chiplet synchronization.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for chiplet synchronization. In an example, central processing unit (CPU) hardware provides an on-chip parallel network with point-to-point communications capability. Chiplets are configured to use this parallel network as a control bus with dedicated control messages and a push mechanism for chiplet synchronization with parallel operation. The chiplets each maintain one or more counter for each other chiplet involved in carrying out an operation for a process (e.g., thread), and the counter(s) are incremented upon receipt of dedicated control messages from the other chiplets involved in the operation. Advancing a synchronization barrier at each chiplet when all of the counters are incremented ensures the chiplets remain synchronized in carrying out the operation while appearing as a single chip to the process. The use of a parallel control network avoids traffic congestion of a data network, improving both data and control network throughputs. The push mechanism reduces traffic on the control network, and the on-chip implementation avoids hardwired point-to-point connections between chiplets, which is impractical with large numbers (e.g., one-thousand or more) of chiplets.

In one example, a computer-implemented method, at least a portion of the method being performed by a computing device comprising a plurality of chiplets, can include reaching, by a chiplet involved in carrying out an operation for a process, a synchronization barrier, receiving, by the chiplet, dedicated control messages that are pushed to the chiplet by other chiplets involved in carrying out the operation for the process, wherein the dedicated control messages are pushed over a control network by the other chiplets, and advancing, by the chiplet, the synchronization barrier in response to receipt of the dedicated control messages.

Another example can be the example of the previously described example method, wherein the control network corresponds to an on-chip network that provides connections between the chiplet and at least one of the other chiplets.

Another example can be the example of the previously described example method, wherein the connections are point-to-point connections.

Another example can be the example of the previously described example method, wherein the control network corresponds to a separate control network implemented in parallel with a separate data network that also provides connections between the chiplet and at least one of the other chiplets.

Another example can be the example of the previously described example method, wherein the chiplet and at least one of the other chiplets are implemented on different chips.

Another example can be the method of any of the previously described example methods, further including pushing, by the chiplet and in response to reaching the synchronization barrier, one or more outgoing dedicated control messages, wherein the one or more outgoing dedicated control messages are pushed to the other chiplets over the control network.

Another example can be the method of any of the previously described example methods, further including maintaining, by the chiplet, a set of counters that includes at least one counter for each of the other chiplets.

Another example can be the method of any of the previously described example methods, further including incrementing counters of the set of counters in response to receipt of the dedicated control messages.

Another example can be the method of any of the previously described example methods, further including wherein advancing the synchronization barrier further occurs in response to reaching the synchronization barrier.

In one example, a system can include a chiplet processor and a physical memory comprising computer-executable instructions that, when executed by the chiplet processor, cause the chiplet processor to reach, by a chiplet involved in carrying out an operation for a process, a synchronization barrier, receive, by the chiplet, dedicated control messages that are pushed to the chiplet by other chiplets involved in carrying out the operation for the process, wherein the dedicated control messages are pushed over a control network by the other chiplets, and advance, by the chiplet, the synchronization barrier in response to receipt of the dedicated control messages.

Another example can be the system of the previously described example system, wherein the control network corresponds to an on-chip network that provides connections between the chiplet and at least one of the other chiplets.

Another example can be the system of any of the previously described example systems, wherein the connections are point-to-point connections.

Another example can be the system of any of the previously described example systems, wherein the control network corresponds to a separate control network implemented in parallel with a separate data network that also provides connections between the chiplet and at least one of the other chiplets.

Another example can be the system of any of the previously described example systems, wherein the chiplet and at least one of the other chiplets are implemented on different chips.

Another example can be the system of any of the previously described example systems, wherein the instructions further cause the chiplet processor to push, in response to reaching the synchronization barrier, one or more outgoing dedicated control messages, wherein the one or more outgoing dedicated control messages are pushed to the other chiplets over the control network.

Another example can be the system of any of the previously described example systems, wherein the instructions further cause the chiplet processor to maintain a set of counters that includes at least one counter for each of the other chiplets.

Another example can be the system of any of the previously described example systems, wherein the instructions further cause the chiplet processor to increment counters of the set of counters in response to receipt of the dedicated control messages.

Another example can be the system of any of the previously described example systems, wherein advancing the synchronization barrier further occurs in response to reaching the synchronization barrier.

In one example, a non-transitory computer-readable medium can include one or more computer-executable instructions that, when executed by a chiplet processor carrying out an operation for a process, cause the chiplet processor to reach, by a chiplet involved in carrying out an operation for a process, a synchronization barrier, receive, by the chiplet, dedicated control messages that are pushed to the chiplet by other chiplets involved in carrying out the operation for the process, wherein the dedicated control messages are pushed over a control network by the other chiplets, and advance, by the chiplet, the synchronization barrier in response to receipt of the dedicated control messages.

Another example can be the previously described non-transitory computer-readable medium, wherein the control network corresponds to an on-chip network that provides connections between the chiplet and at least one of the other chiplets.

Figure 2:
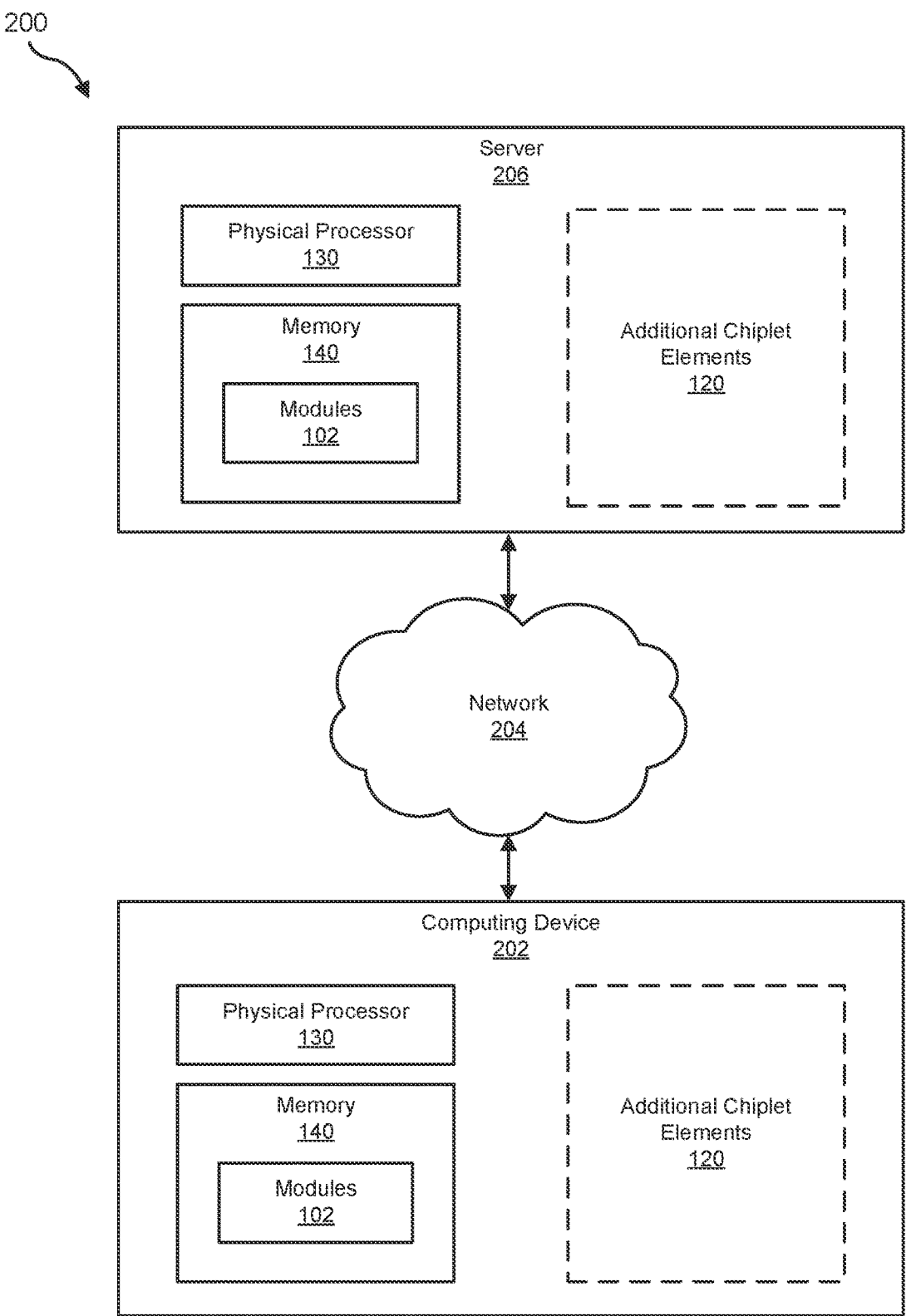
FIG. 2 is a block diagram of an additional example system for chiplet synchronization.

The following will provide, with reference to FIGS. 1-2, detailed descriptions of example systems for chiplet synchronization. Detailed descriptions of corresponding computer-implemented methods will also be provided in connection with FIG. 3. In addition, detailed descriptions of example chiplets having local dispatchers exchanging dedicated control messages over a parallel on-chip network will be provided in connection with FIG. 4. Further, detailed descriptions of an example chiplet processor implementing a chiplet synchronization process will be provided in connection with FIG. 5.

FIG. 1 is a block diagram of an example system 100 for chiplet synchronization. As illustrated in this figure, example system 100 can include one or more modules 102 for performing one or more tasks. As will be explained in greater detail below, modules 102 can include a synchronization barrier observation module 104, a control message receipt module 106, and a synchronization barrier advancement module 108. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. In additional or alternative examples, memory 140 can represent any one or a combination of various elements (e.g., main chiplet processor memory, additional chiplet elements 120, standalone processing elements, etc.) that store and/or carry out operations of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate chiplet synchronization. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 can also include one or more additional chiplet elements, such as additional chiplet elements 120. Additional chiplet elements 120 generally represents any type or form of physical memory, communication media, network interfaces, dispatch controllers, process operations, or combinations thereof. In one example, additional chiplet elements can carry out operations for a process and maintain/manage associated data, exchange data messages over a data network, transmit and receive dedicated control messages over a parallel on-chip network, and/or maintain/manage data used for synchronization. Examples of additional chiplet elements include, without limitation, operations for a process 122, synchronization barrier 124, dedicated control messages 126, and control network 128.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In some examples, network 204 can represent parallel networks (e.g., separate data and control networks, with synchronization between devices (e.g., chiplets in a single socket, or chiplets across multiple sockets) being performed over a separate logical or physical control network).

In one example, all or a portion of the functionality of modules 102 can be performed by computing device 202, server 206, and/or any other suitable computing system. As will be described in greater detail below, one or more of modules 102 from FIG. 1 can, when executed by at least one processor of computing device 202 and/or server 206, enable computing device 202 and/or server 206 to perform chiplet synchronization.

Computing device 202 generally represents any type or form of computing device capable of reading computer-executable instructions. For example, computing device 202 can be any computer capable of receiving, processing, and storing data. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of receiving, processing, and storing data. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for chiplet synchronization. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

As illustrated in FIG. 3, at step 302 one or more of the systems described herein can reach a synchronization barrier. For example, synchronization barrier observation module 104 can, as part of computing device 202 in FIG. 2, reach, by a chiplet involved in carrying out an operation for a process, a synchronization barrier.

The term "synchronization barrier," as used herein, generally refers to a type of synchronization method in which a barrier for a group of processes in the source code means any process must stop at this point and cannot proceed until all other processes reach this barrier. Examples of synchronization barriers include, without limitation, implicit barriers imposed by collective routines and directive-based parallel languages, latches used in concurrent computing in which the barrier has a raised or lowered state and cannot be re-raised once it is in the lowered state, and count-down latches that are automatically lowered once a pre-determined number of processes have arrived.

The term "process," as used herein, generally refers to a smallest sequence of programmed instructions that can be managed independently by a scheduler, which is typically a part of an operating system. Examples of processes include, without limitation, a component of a process (e.g., thread). Multiple threads of a given process may be executed concurrently (via multithreading capabilities), sharing resources such as memory, while different processes do not share these resources. The threads of a process can share its executable code and the values of its dynamically allocated variables and non-thread-local global variables at any given time.

The term "operation," as used herein, generally refers to an action that is carried out to accomplish a given task. Examples of operations include, without limitation, inputting, processing, outputting, storing, and controlling.

The systems described herein can perform step 302 in a variety of ways. In some examples, synchronization barrier observation module 104 can, as part of computing device 202 in FIG. 2, observe that the chiplet has carried out operations for the process until the synchronization barrier is reached. Carrying out the operations of the process can include exchanging data, by the chiplet with the other chiplets, over a data network connecting the chiplet and the other chiplets, and the on-chip network can be implemented as a parallel control network that avoids traffic congestion of the data network. In some of these examples, synchronization barrier observation module 104 can, as part of computing device 202 in FIG. 2, detect an event or receive a notification indicating that the synchronization barrier has been reached. In additional or alternative examples, synchronization barrier observation module 104 can, as part of computing device 202 in FIG. 2, push, by the chiplet and in response to reaching the synchronization barrier, one or more outgoing dedicated control messages, wherein the one or more outgoing dedicated control messages are pushed to the other chiplets over the on-chip network.

At step 304 one or more of the systems described herein can receive dedicated control messages. For example, control message receipt module 106 can, as part of computing device 202 in FIG. 2, receive, by the chiplet, dedicated control messages pushed to the chiplet by other chiplets involved in carrying out the operation for the process, wherein the dedicated control messages are pushed over a control network by the other chiplets.

The term "dedicated control messages," as used herein, generally refers to messages containing requests, commands, and/or notifications that affect operation of chiplets. Examples of dedicated control messages include, without limitation, broadcast, multicast, and/or narrowcast messages containing requests for a chiplets current state (e.g., awake, asleep, etc.), commands to change state (e.g., wake up, etc.), notifications relating to synchronization, etc.

The term "pushed," as used herein, generally refers to a push mechanism that performs a transmission to a recipient that is not in response to a request from the recipient. Examples of push mechanism utilization include, without limitation, broadcast, multicast, or narrowcast of a message by a sender in response to satisfaction of a condition and/or occurrence an event (e.g., reaching a synchronization barrier) at the sender. Although push mechanisms often involve a recipient subscribing to receive pushed messages from a sender, a broadcast push to all chiplets can be performed without the need for a subscription. If a chiplet involved in carrying out operations for a process knows which other chiplets are involved in carrying out the operations for the process, and if the control network has a switch fabric implementation, a multicast or narrowcast push to the other chiplets can be performed without the need for a subscription.

The term "control network," as used herein, generally refers to a network having the features of a data network but used primarily (e.g., exclusively) for communication of control messages. Examples of on-chip networks include, without limitation, a control network implemented in parallel with a data network, an on-chip network (e.g., integrated onto the same chip (i.e., the same piece of silicon) as the chiplet and/or chiplet package), and/or inter-chip (e.g., inter-socket) control networks providing connections between chiplets implemented on different chips. In some of these examples, the control network may provide point-to-point connections, provide a shared broadcast bus, have a hierarchical tree topology, have another topology, etc.

The term "point-to-point connections," as used herein, generally refers to a communications connection between two communication endpoints or nodes. Examples of point-to-point connections include, without limitation, physical (i.e., hardwired) connections and virtual connections, where the virtual connections avoid the need for physical connections between every node (e.g., chiplet) and every other node (e.g., other chiplet) and do not have a round trip time because the messaging is direct, as opposed to indirect.

The systems described herein can perform step 304 in a variety of ways. In some examples, control message receipt module 106 can, as part of computing device 202 in FIG. 2, receive a dedicated control message from each of the other chiplets. In some of these examples, control message receipt module 106 can, as part of computing device 202 in FIG. 2, receive the dedicated control messages using a local dispatcher of the chiplet. In additional or alternative examples, control message receipt module 106 can, as part of computing device 202 in FIG. 2, maintain, by the chiplet, a set of counters that includes at least one counter for each of the other chiplets. In some of these examples, control message receipt module 106 can, as part of computing device 202 in FIG. 2, increment counters of the set of counters in response to receipt of the dedicated control messages.

At step 306, one or more of the systems described herein can advance the synchronization control barrier. For example, synchronization barrier advancement module 108 can, as part of computing device 202 in FIG. 2, advance, by the chiplet, the synchronization barrier in response to receipt of the dedicated control messages.

The systems described herein can perform step 306 in a variety of ways. In some examples, synchronization barrier advancement module 108 can, as part of computing device 202 in FIG. 2, advance the synchronization barrier in response to all of the counters in the set of counters being incremented at step 304. In some of these examples, synchronization barrier advancement module 108 can, as part of computing device 202 in FIG. 2, advance the synchronization barrier further in response to reaching the synchronization barrier at step 302.

Figure 4:
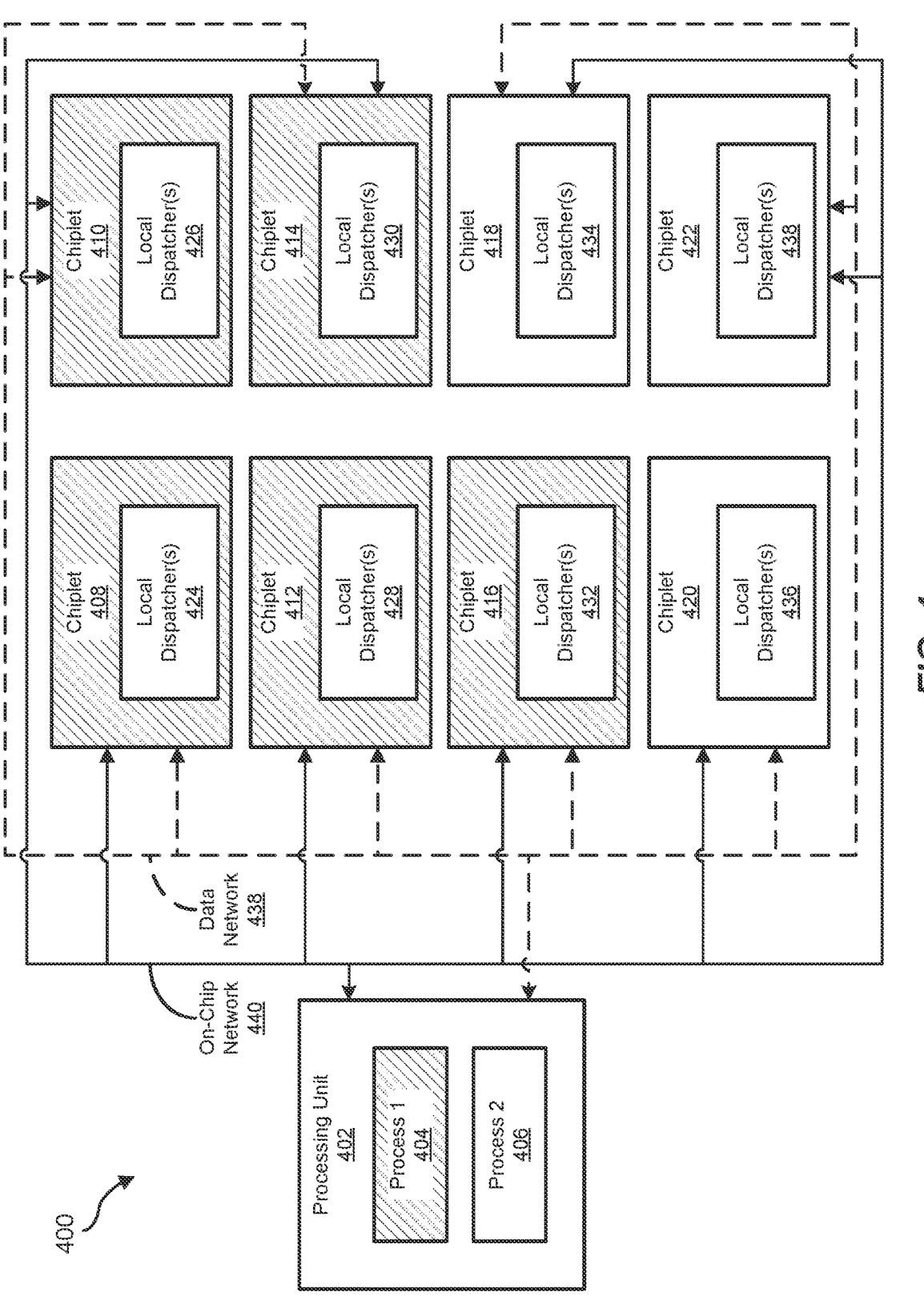
FIG. 4 is a block diagram illustrating chiplets having local dispatchers exchanging dedicated control messages over a control network.

Referring to FIG. 4, a chiplet package 400 can include a processing unit 402 (e.g., central processing unit, graphics processing unit, etc.) running processes, such as processes 404 and 406 of a process. Chiplet package 400 can also include chiplets 408-422 having local dispatchers 424-436 exchanging various messages over a data network 438 and over a parallel on-chip network 440. For example, local dispatchers 424-436 can exchange data messages relating to process operations over data network 438 and exchange dedicated control messages over parallel on-chip network 440.

Parallel on-chip network 440 can provide connections between chiplets 408-424 and/or processing unit 402 in various ways. For example, parallel on-chip network 440 can provide virtual point-to-point connections by utilizing a communications medium having a switch fabric capable of routing dedicated control messages in a narrowcast, multicast, and/or broadcast manner. Alternatively, parallel on-chip network 440 can include a communications medium (e.g., shared broadcast bus) over which dedicated control messages are transmitted in a broadcast fashion with collision handling procedures similar to those employed in optical and/or wireless networks. For example, when two or more chiplets perform simultaneous transmissions that result in a collision of the transmissions, the two or more chiplets can detect the collision and locally implement randomized delays for reattempting their respective transmissions. Alternatively, network 440 can have a hierarchical tree topology or another topology.

In one example, processing unit 402 can assign chiplets 408-416 a task of carrying out operations of process 404 and can assign chiplets 418-424 a task of carrying out operations for process 406. These assignments form virtual machines, one of which includes chiplets 408-416 and the other of which includes chiplets 418-424. The assignments can inform each of the chiplets the identities of each of the other chiplets in the same virtual machine. In some examples, a chiplet can broadcast a dedicated control message to all other chiplets that identifies the chiplet as the sender and indicates that the chiplet has arrived at a synchronization barrier. A first portion of the other chiplets, perceiving the identity of the chiplet as the sender and having knowledge that the chiplet is not in the same virtual machine as the first portion of the other chiplets, can ignore this dedicated control message. A second portion of the other chiplets, perceiving the identity of the chiplet as the sender and having knowledge that the chiplet is in the same virtual machine as the second portion of the other chiplets, can advance their respective synchronization barriers at least partly in response to this dedicated control message. In other examples, a chiplet can multicast a dedicated control message to other chiplets assigned to the same virtual machine as the chiplet, and the message can identify the chiplet as the sender and indicate that the chiplet has arrived at a synchronization barrier. The other chiplets receiving the multicast dedicated control message, perceiving the identity of the chiplet as the sender, can advance their respective synchronization barriers at least partly in response to the multicast dedicated control message. In other examples, a chiplet can narrowcast dedicated control messages to each of the other chiplets assigned to the same virtual machine as the chiplet, and the messages can identify the chiplet as the sender and indicate that the chiplet has arrived at a synchronization barrier. The other chiplets receiving the narrowcast dedicated control message, perceiving the identity of the chiplet as the sender, can advance their respective synchronization barriers at least partly in response to the narrowcast dedicated control messages.

Figure 5:
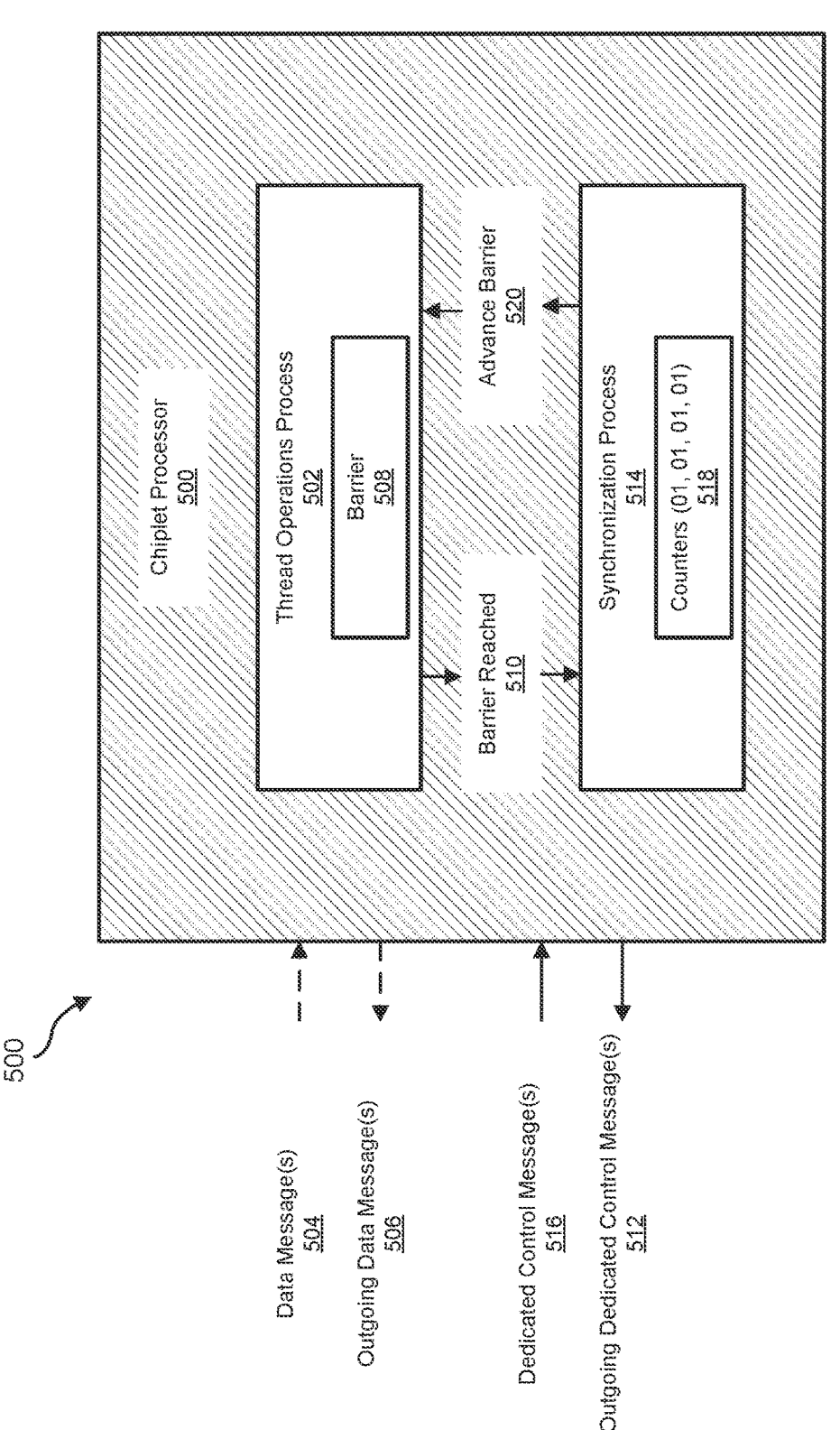
FIG. 5 is a block diagram illustrating a chiplet processor implementing a chiplet synchronization process.

Referring to FIG. 5, a chiplet processor 500 (e.g., chiplet 408 of FIG. 4) can implement a thread operations process 502 that involves transmitting and receiving, over a data network (e.g., data network 438 of FIG. 4), data message(s) 504 and outgoing data message(s) 506. Thread operations process 502 can observe a synchronization barrier 508 and provide a notification 510 that the barrier has been reached. This notification can cause transmission of one or more outgoing dedicated control message(s) 512 over a parallel on-chip control network (e.g., on-chip network 440 of FIG. 4) by one or more local dispatchers (e.g., local dispatchers 424 of FIG. 4) to other chiplet processors (e.g., chiplets 426-432 of FIG. 4) involved in carrying out operations of the same process (e.g., process 404 of FIG. 4) as chiplet processor 500.

Chiplet processor 500 can also implement a synchronization process 514 that receives the notification 510 and/or observes an event associated with the notification 510 and/or transmission of the outgoing dedicated control message(s) 512. Synchronization process 514 can also maintain and manage a set of counters 518 that includes a counter for each other chiplet processor involved in carrying out the operations for a same process. For example, synchronization process 514 can maintain and manage a set of four counters, one for each of the other chiplet processors assigned to the same virtual machine as chiplet processor 500. Upon receiving, by the one or more local dispatchers, dedicated control messages from each of the other chiplet processors, synchronization process 514 can increment (e.g., raise to high) the respective counters maintained and managed by synchronization process 514. In response to all of the counters in the set of counters 518 being incremented and in response to notification 510, synchronization process 514 can, at 520, advance barrier 508. Advancement of barrier 508 allows thread operations process 502 to continue performing operations for the process until arriving at the advanced barrier.

As set forth above, the disclosed systems and methods perform multi-client barriers using hardware blocks connected through a parallel on-chip network employed as a control bus. Normally, such multi-client barriers are contained in shared memory locations. Managing these barrier objects in shared memory locations causes numerous issues.

For example, accessing a shared layer of memory requires long latency and high energy because the shared memory location may be at a system coherence point, potentially requiring access of dynamic random-access memory (DRAM). Additionally, utilizing memory mapped input/output (MMIO) hardware mapped to a memory location still requires a long traversal of the hierarchy of the data fabric to access the shared coherence point. Also, using normal memory-backed structures to store synchronization objects requires loading the current value into the core, updating the value, and then storing the new value into the location in memory. These operations add latency and consume energy. Further, requests to the synchronization object, which can be extremely time critical, share bus resources with normal memory requests on an on-chip fabric. Still further, accesses to the synchronization objects utilize a "pull" method, as every client trying to perform the synchronization is required to "pull" the object in from its memory address. Without synchronization hardware on the other side, this "pull" methodology also results in spin-looping, which consumes energy and introduces noise on the shared data bus.

The disclosed systems and methods instead maintain and manage synchronization objects in hardware connected to the parallel on-chip network, yielding various benefits. For example, this implementation allows clients to "push" updates to other clients sharing a synchronization object. Advantageously, a client can broadcast and/or multicast a dedicated control message to all other receiving clients, so only a single message is needed to acquire or release a lock or arrive/wait at a barrier. Additionally, by having a command bus implemented over a parallel on-chip network, chiplets can avoid waiting behind other memory accesses when trying to perform these latency critical synchronization operations, potentially with optimized routing for a limited number of clients that specifically need to perform the synchronization. Also, performing low-power operations is facilitated by avoiding the need to utilize a larger, less energy efficient data fabric for quick synchronization queries. Further, implementing a multi-client barrier over a parallel on-chip network facilitates limitation of interference between virtual machines that share the same data fabric path to memory. For instance, two multi-client partitions can share a single memory system, and each partition can be in use by a separate virtual machine. If both of those partitions need to use the shared memory system to perform barriers, then a high memory system usage from one virtual machine can cause added hardware synchronization latency into another virtual machine due to the synchronization using the shared data path resource. Such synchronization latency is undesirable. Utilizing a parallel on-chip network for synchronization ameliorates this undesirable latency because the clients are under firmware or hardware control and they see less interference from data messages.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising a plurality of chiplets, the method comprising:

reaching, by a chiplet involved in carrying out an operation for a process, a synchronization barrier;

receiving, by the chiplet, dedicated control messages that are pushed to the chiplet by other chiplets involved in carrying out the operation for the process, wherein the dedicated control messages are pushed over a control network by the other chiplets; and advancing, by the chiplet, the synchronization barrier in response to receipt of the dedicated control messages;

wherein the computing device includes an on-chip network that comprises the control network and a separate data network implemented in parallel with the control network, the data network being configured to provide additional connections between the chiplet and at least one of the other chiplets.

2. The method of claim 1, wherein the connections are point-to-point connections.

3. The method of claim 1, wherein the chiplet and at least one of the other chiplets are implemented on different chips.

4. The method of claim 1, further comprising:

pushing, by the chiplet and in response to reaching the synchronization barrier, one or more outgoing dedicated control messages, wherein the one or more outgoing dedicated control messages are pushed to the other chiplets over the control network.

5. The method of claim 1, further comprising:

maintaining, by the chiplet, a set of counters that includes at least one counter for each of the other chiplets.

6. The method of claim 5, further comprising:

incrementing counters of the set of counters in response to receipt of the dedicated control messages.

7. The method of claim 1, wherein advancing the synchronization barrier further occurs in response to reaching the synchronization barrier.

8. A system comprising:

a chiplet processor; and physical memory comprising computer-executable instructions that, when executed by the chiplet processor in carrying out an operation for a process, cause the chiplet processor to:

reach, by a chiplet involved in carrying out an operation for a process, a synchronization barrier;

receive, by the chiplet, dedicated control messages that are pushed to the chiplet by other chiplets involved in carrying out the operation for the process, wherein the dedicated control messages are pushed over a control network by the other chiplets; and advance, by the chiplet, the synchronization barrier in response to receipt of the dedicated control messages, wherein the chiplet processor includes an on-chip network that comprises the control network and a separate data network implemented in parallel with the control network, the data network being configured to provide additional connections between the chiplet and at least one of the other chiplets.

9. The system of claim 8, wherein the connections are point-to-point connections.

10. The system of claim 8, wherein the chiplet and at least one of the other chiplets are implemented on different chips.

11. The system of claim 8, wherein the instructions further cause the chiplet processor to:

push, in response to reaching the synchronization barrier, one or more outgoing dedicated control messages, wherein the one or more outgoing dedicated control messages are pushed to the other chiplets over the control network.

12. The system of claim 8, wherein the instructions further cause the chiplet processor to:

maintain a set of counters that includes at least one counter for each of the other chiplets.

13. The system of claim 12, wherein the instructions further cause the chiplet processor to:

increment counters of the set of counters in response to receipt of the dedicated control messages.

14. The system of claim 8, wherein advancing the synchronization barrier further occurs in response to reaching the synchronization barrier.

15. A non-transitory computer-readable medium comprising one or more computer-executable instructions that, when executed by a chiplet processor carrying out an operation for a process, cause the chiplet processor to:

reach, by a chiplet involved in carrying out an operation for a process, a synchronization barrier;

receive, by the chiplet, dedicated control messages that are pushed to the chiplet by other chiplets involved in carrying out the operation for the process, wherein the dedicated control messages are pushed over a control network by the other chiplets; and advance, by the chiplet, the synchronization barrier in response to receipt of the dedicated control messages, wherein the chiplet processor includes an on-chip network that comprises the control network and a separate data network implemented in parallel with the control network, the data network being configured to provide additional connections between the chiplet and at least one of the other chiplets.

* * * * *